US012394427B2

(12) United States Patent
Tan et al.

(10) Patent No.: US 12,394,427 B2
(45) Date of Patent: Aug. 19, 2025

(54) METHOD FOR SELECTIVE NOISE SUPPRESSION IN AUDIO PLAYBACK

(71) Applicant: Creative Technology Ltd, Singapore (SG)

(72) Inventors: Kee Seng Tan, Singapore (SG); Luen Kai Chan, Singapore (SG); Ariel Arellano De Castro, Singapore (SG)

(73) Assignee: CREATIVE TECHNOLOGY LTD, Singapore (SG)

(*) Notice: Subject to any disclaimer, the term of this patent is extended or adjusted under 35 U.S.C. 154(b) by 235 days.

(21) Appl. No.: 18/456,216

(22) Filed: Aug. 25, 2023

(65) Prior Publication Data

US 2024/0105200 A1 Mar. 28, 2024

Related U.S. Application Data

(60) Provisional application No. 63/409,131, filed on Sep. 22, 2022.

(51) Int. Cl.
*G10L 21/0216* (2013.01)
*G10L 25/78* (2013.01)

(52) U.S. Cl.
CPC .......... *G10L 21/0216* (2013.01); *G10L 25/78* (2013.01); *G10L 2021/02163* (2013.01)

(58) Field of Classification Search
None
See application file for complete search history.

(56) References Cited

U.S. PATENT DOCUMENTS

| | | | | |
|---|---|---|---|---|
| 8,126,706 B2 * | 2/2012 | Ebenezer | G10L 25/90 | 704/208 |
| 8,320,974 B2 * | 11/2012 | Nicholson | H04R 3/002 | 381/71.1 |
| 9,363,352 B2 * | 6/2016 | Yew | H04B 3/20 | |
| 9,398,367 B1 * | 7/2016 | Scott | H04R 1/1083 | |
| 9,741,334 B2 * | 8/2017 | Park | G10K 11/1783 | |
| 11,240,609 B2 * | 2/2022 | Dehghani | G10H 1/125 | |
| 11,729,563 B2 * | 8/2023 | Berthelsen | H04R 25/552 | 381/312 |
| 11,741,935 B2 * | 8/2023 | Sibbald | H04R 1/1083 | 381/71.6 |
| 12,302,052 B2 * | 5/2025 | Park | H04R 1/1016 | |
| 2012/0058803 A1 | 3/2012 | Nicholson | | |
| 2014/0213329 A1 * | 7/2014 | Wu | H04M 1/6058 | 455/570 |
| 2018/0286423 A1 * | 10/2018 | Nakadai | G10L 21/028 | |

(Continued)

OTHER PUBLICATIONS

European Patent Office, European Office Action dated Jan. 19, 2024 in Application No. 23198990.6.

*Primary Examiner* — Paul W Huber
(74) *Attorney, Agent, or Firm* — SNELL & WILMER L.L.P.

(57) ABSTRACT

A method for selective noise suppression in an audio playback is provided. The method includes providing a processor, obtaining a microphone state and a playback device state with the processor from an operating system, determining the audio playback is communication audio based on the microphone state and the playback device state, and enabling applying noise suppression to the audio playback if the audio playback is communication audio, is not music and noise is present, or otherwise disabling applying noise suppression to the audio playback.

15 Claims, 3 Drawing Sheets

(56) References Cited

U.S. PATENT DOCUMENTS

| | | | | |
|---|---|---|---|---|
| 2020/0105295 | A1 | 4/2020 | Sereshki et al. | |
| 2022/0051652 | A1 | 2/2022 | Winsvold et al. | |
| 2022/0406285 | A1* | 12/2022 | Neves | H04R 1/08 |
| 2025/0078852 | A1* | 3/2025 | Liu | G10L 25/81 |

* cited by examiner

METHOD FOR SELECTIVE NOISE SUPPRESSION IN AUDIO PLAYBACK

CROSS-REFERENCE TO RELATED APPLICATIONS

This application claims priority to and the benefit of, U.S. Provisional Patent Application No. 63/409,131, filed Sep. 22, 2022 and entitled "METHOD FOR SELECTIVE NOISE SUPPRESSION IN AN AUDIO PLAYBACK." The foregoing application is hereby incorporated in its entirety by reference for all purposes.

FIELD

The present invention generally relates to noise suppression, and more particularly relates to selective noise suppression by detecting communication audio.

BACKGROUND

Noise suppression during audio playback is typically applied constantly when the feature is enabled, and is applied to all audio content that is being played over the playback device. Noise suppression is desirable for noisy audio content such as audio from a remote calling party, i.e., communication audio, who is speaking in a noisy environment. However, noise suppression may degrade audio from music and movies.

Thus, it can be seen that what is needed is a method for selective noise suppression in an audio playback using a communication audio detector. Furthermore, other desirable features and characteristics will become apparent from the subsequent detailed description and the appended claims, taken in conjunction with the accompanying drawings and this background of the disclosure.

SUMMARY

In one aspect of the invention, a method for selective noise suppression in an audio playback is provided. The method includes providing a processor, obtaining a microphone state and a playback device state with the processor from an operating system, determining the audio playback is communication audio based on the microphone state and the playback device state, and enabling applying noise suppression to the audio playback if the audio playback is communication audio, is not music and noise is present, or otherwise disabling applying noise suppression to the audio playback.

In another aspect of the invention, a software product for selective noise suppression in an audio playback is provided. The software product is embodied in a non-transitory computer readable medium and includes computer executable instructions for: obtaining a microphone state and a playback device state with a processor from an operating system, determining the audio playback is communication audio based on the microphone state and the playback device state, and enabling applying noise suppression to the audio playback if the audio playback is communication audio, is not music and noise is present, or otherwise disabling applying noise suppression to the audio playback.

In another aspect of the invention, a system for selective noise suppression in an audio playback is provided. The system includes a communication audio detection module configured for receiving a microphone state and a playback device state, and determining the audio playback is communication audio based on the microphone state and the playback device state, a music detection module configured for determining the audio playback is not music, a noise detection module configured for determining the audio playback has noise present, an enable noise suppression module configured for enabling applying noise suppression to the audio playback if the audio playback is communication audio, is not music and noise is present, and a disable noise suppression module configured for disabling applying noise suppression to the audio playback if the audio playback is not communication audio, and/or is music, and/or noise is not present.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is an intent of the various embodiments to present a method for selective noise suppression in an audio playback.

The present invention allows noise suppression to be applied to noisy speeches when communication audio is detected, and not applied when no communication audio is detected. Noise suppression is also not applied when the audio is detected as music, or when no noise is detected in the communication audio.

Figure 1:
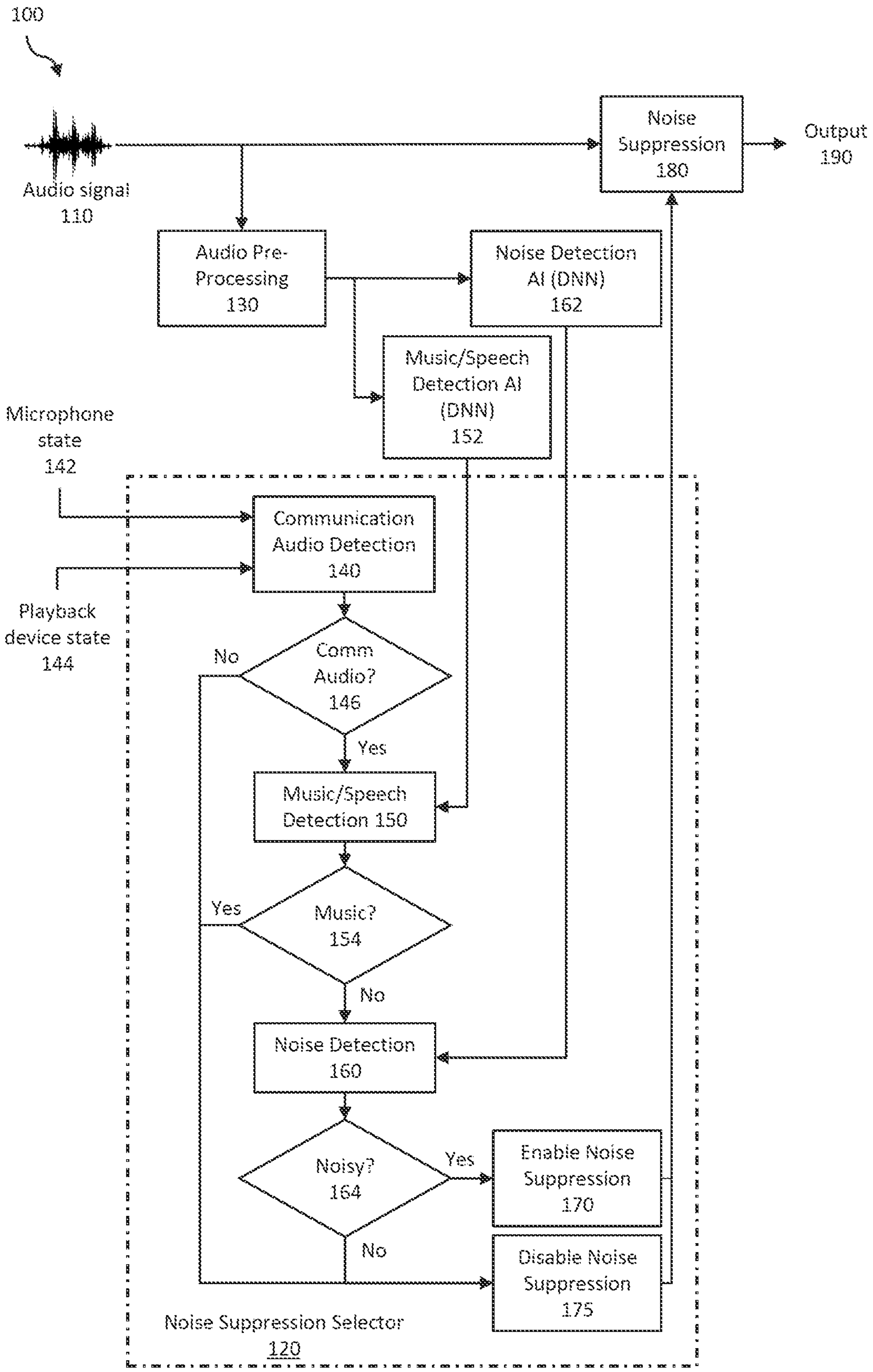
FIG. 1 is a system block diagram for selective noise suppression in an audio playback in accordance with various embodiments.

Referring to FIG. 1, a system block diagram 100 for selective noise suppression in an audio playback in accordance with various embodiments is shown. An audio signal 110 from an audio playback is transmitted to an audio pre-processing module 130 and a noise suppression module 180 in real-time. A noise suppression selector module 120 transmit a signal to the noise suppression module 180 to enable or disable noise suppression, and the noise suppression module 180 will apply/stop applying the noise suppression to the audio signal 110 of the audio playback accordingly, and outputs the audio playback either with noise suppressed or not suppressed through output 190 in real-time. The noise suppression selector module 120 includes various modules 140, 150, 160, 170 and 175, and various determination modules 146, 154 and 164, which can be implemented separately or combined together.

The audio signal 110 from the audio playback is transmitted to an audio pre-processing module 130. The audio pre-processing module 130 transforms the audio signal 110 into a suitable format for the music/speech detection Artificial Intelligence (AI) (Deep Neural Network (DNN)) 152 and/or the noise detection Artificial Intelligence (AI) (Deep Neural Network (DNN)) 162 in real-time. For example, the audio signal 110 in time domain can be transformed into frequency domain using Short-Time Fourier Transform (SFTF). From the STFT data, magnitude spectrum is calculated, and then Mel Coefficients with 13 bands is calculated from the magnitude spectrum. 64 sets of 13-band Mel Coefficients are collected to form a Mel Spectrogram. The Mel Spectrogram data (60×1×13) can then be transmitted to the music/speech detection AI (DNN) 152 and/or the noise detection AI (DNN) 162 for the purposes of running inferences and generating their respective analysis.

In one embodiment, a communication audio detection module 140 in the noise suppression selector module 120 obtains a microphone state 142 and a playback device state 144 from the operating system by querying the audio functions of the operating system to check the states of the microphone and playback device (which includes speakers, headphones and other audio playback devices). The microphone state 142 can be obtained by querying the operating system on whether the microphone device has been opened or acquired through an audio application programming interface (API). In software terminology, the microphone is acquired or opened when there are software applications/modules which have called the audio APIs to use the microphone. If a microphone device has been acquired or opened by any software applications/modules, it is deemed to be active. Similarly, if a playback device has been acquired or opened by any software applications/modules, it is deemed to be active. Thus, the microphone state 142 and the playback device state 144 are active when acquired or opened by any software application/module through an audio API. Based on the microphone state 142 and the playback device state 144, the communication audio detection module 140 determines if the audio playback is a communication audio in 146. If either or both of the microphone state 142 or the playback device state 144 are inactive, the audio playback is determined not to be communication audio and a disable noise suppression module 175 will send a signal to the noise suppression module 180. The audio playback is determined to be communication audio only when the microphone state 142 and the playback device state 144 are both active, and a music/speech detection module 150 will obtain the analysis result of the music/speech detection AI (DNN) module 152. Based on the analysis result, the music/speech detection module 150 determines if the audio playback is music in 154. If determined that the audio playback is music, a disable noise suppression module 175 will send a signal to the noise suppression module 180. However, if the audio playback is not music, a noise detection module 160 will obtain the analysis result of the noise detection AI (DNN) module 162. Based on the analysis result, the noise detection module 160 determines if the audio playback has noise in 164. If determined that the audio playback has no noise, a disable noise suppression module 175 will send a signal to the noise suppression module 180. However, if the audio playback has noise, an enable noise suppression module 170 will send a signal to the noise suppression module 180. In this way, the noise suppression selector module 120 determines and transmits a signal to the noise suppression module 180 to enable or disable noise suppression.

In another embodiment, the communication audio detection module 140 in the noise suppression selector module 120 also obtains a first identifier and a second identifier from the operating system (not shown). The first identifier and the second identifier are means in which the operating system can identify the software application/module which had opened or acquired the microphone and the playback device respectively. The first identifier and the second identifier can, for example, be a string of alphanumeric characters or bit state. The first identifier can be provided to the operating system by a software application/module which acquired the microphone, and the second identifier can be provided to the operating system by a software application/module which acquired the playback device. The audio playback is determined to be communication audio only when both the microphone state and the playback device state are active, and both the first identifier and the second identifier indicate that they are from the same app/software. For example, the first identifier and the second identifier can both be "17820" and are thus the same, indicating that they are from the same app/software. If either or both of the microphone state or the playback device state are inactive, the audio playback is determined not to be communication audio. If the first identifier and the second identifier indicate that they are from different app/software, the audio playback is determined not to be communication audio. For example, the first identifier can be "17820" and the second identifier can be "19230" and thus are not the same, indicating that they are from different app/software. In another example, a truncated portion of the first identifier and the second identifier is sufficient to determine if they are from the same app/software. The first and second identifiers can, for example, be "178200001" and "178200003" respectively, and the truncated portion be the first 5 characters "17820" indicating that they are from the same app/software if similar, and different app/software if dissimilar. The other modules (150, 160, 170, 175) remain the same as described in the previous embodiment.

The noise suppression module 180 enables noise suppression when it receives a signal from the enable noise suppression module 170, and disables noise suppression when it receives a signal from the disable noise suppression module 175. The noise suppression module 180 outputs the audio playback either with noise suppressed or not suppressed through output 190 in real-time. Hence, noise suppression is applied to the audio playback if the audio playback is communication audio, is not music and noise is present (in the audio playback). Otherwise, noise suppression to the audio playback is disabled.

Figure 2:
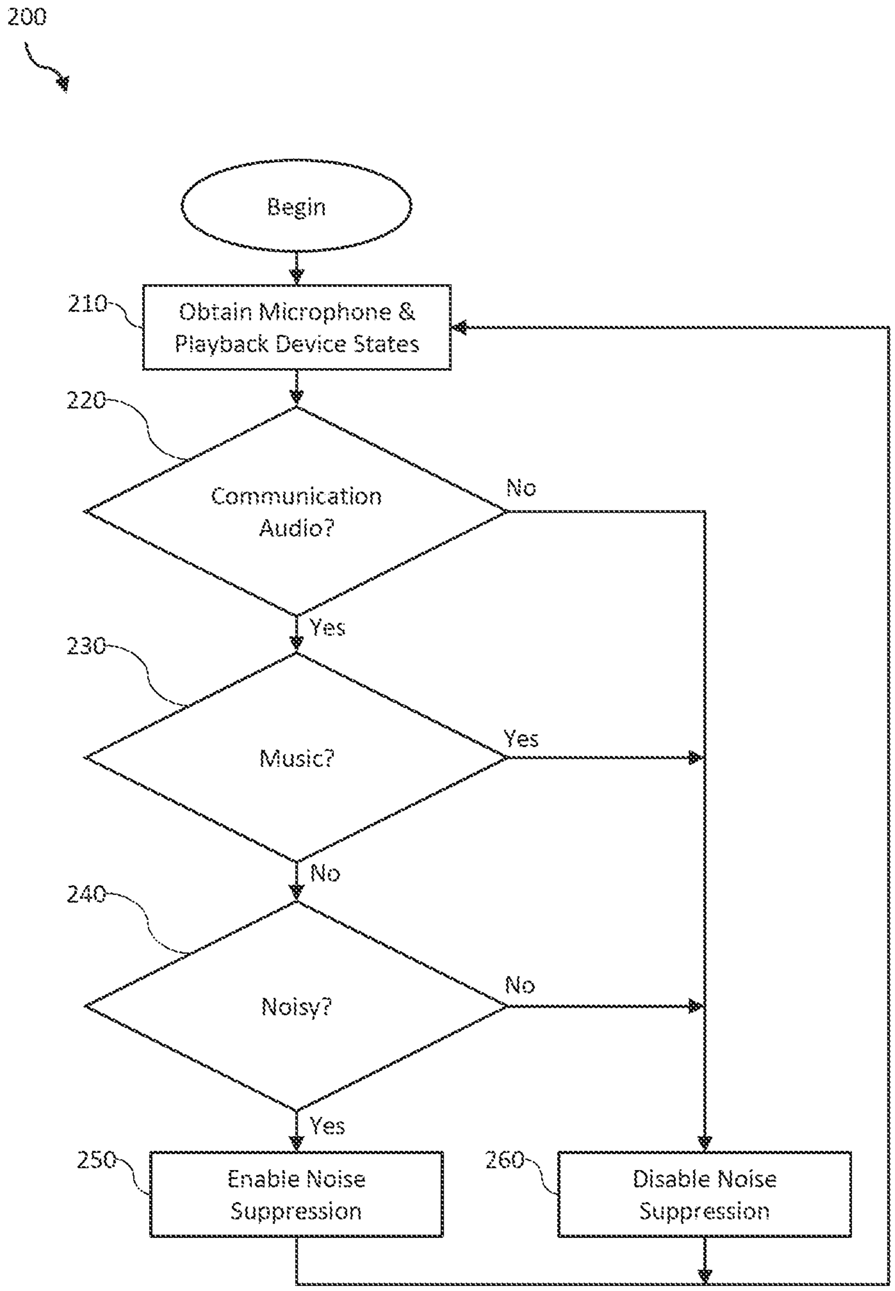
FIG. 2 is a flow diagram depicting a method for selective noise suppression in an audio playback in accordance with various embodiments.

Referring to FIG. 2, a flow diagram 200 depicting a method for selective noise suppression in an audio playback in accordance with various embodiments is shown. A device is provided with a processor (not shown). The processor obtains a microphone state and a playback device state in step 210, and determines if the audio playback is a communication audio based on the microphone state and the playback device state in step 220. In a preferred embodiment, the processor obtains a microphone state and a playback device state by querying the audio functions of the operating system to check the states of the microphone and playback device (which includes speakers, headphones and other audio playback devices). The microphone state can be obtained by querying the operating system on whether the microphone device has been opened or acquired through an audio application programming interface (API). In software terminology, the microphone is acquired or opened when there are software applications/modules which have called the audio APIs to use the microphone. If a microphone device has been acquired or opened by any software applications/modules, it is deemed to be active. Similarly, if a playback device has been acquired or opened by any software applications/modules, it is deemed to be active. Thus, the microphone state and the playback device state are active when acquired or opened by any software application/module through an audio API.

Based on the microphone device state and the playback device state, the processor determines if the audio playback is a communication audio. The audio playback is determined to be communication audio only when the microphone state and the playback device state are both active. If either or both of the microphone state or the playback device state are inactive, the audio playback is determined not to be communication audio.

For example, during a conference call both the microphone and playback device will be opened or acquired by the conference call application. Advantageously, even if the user manually mutes the microphone, the processor is still able to determine that the microphone has been acquired by querying the operating system because muting a microphone does not release the microphone, i.e., the microphone is still opened/acquired by the conference call application. Since the microphone device and the playback device are both active (i.e., the microphone device and playback device are opened/acquired by the conference call application), the audio playback is determined to be communication audio. In another example, when watching a movie or listening to music only the playback device is being used. Although the playback device is active, the microphone device is inactive and thus the audio playback is determined not to be communication audio.

In another embodiment, the processor obtains a microphone state and a playback device state, as well as a first identifier and a second identifier by querying the audio functions of the operating system to check the states of the microphone and playback device (which includes speakers, headphones and other audio playback devices), as well as which software application/module has opened or acquired the microphone and the playback device. The microphone state can be obtained by querying the operating system on whether the microphone device has been opened or acquired through an audio application programming interface (API). In software terminology, the microphone is acquired or opened when there are software applications/modules which have called the audio APIs to use the microphone. If a microphone device has been acquired or opened by any software applications/modules, it is deemed to be active. Similarly, if a playback device has been acquired or opened by any software applications/modules, it is deemed to be active. Thus, the microphone state and the playback device state are active when acquired or opened by any software application/module through an audio API. The first identifier and the second identifier are means in which the operating system can identify the software application/module which had opened or acquired the microphone and the playback device respectively. The first identifier and the second identifier can, for example, be a string of alphanumeric characters or bit state. The first identifier can be provided to the operating system by a software application/module which acquired the microphone, and the second identifier can be provided to the operating system by a software application/module which acquired the playback device. The processor can query the operating system to obtain the first identifier and the second identifier.

Based on the microphone device state and the playback device state, as well as the first identifier and the second identifier, the processor determines if the audio playback is a communication audio. The audio playback is determined to be communication audio only when both the microphone state and the playback device state are active, and both the first identifier and the second identifier indicate that they are from the same app/software. For example, the first identifier and the second identifier can both be "17820" and are thus the same, indicating that they are from the same app/software. If either or both of the microphone state or the playback device state are inactive, the audio playback is determined not to be communication audio. If the first identifier and the second identifier indicate that they are from different app/software, the audio playback is determined not to be communication audio. For example, the first identifier can be "17820" and the second identifier can be "19230" and thus are not the same, indicating that they are from different app/software. In another example, a truncated portion of the first identifier and the second identifier is sufficient to determine if they are from the same app/software. The first and second identifiers can, for example, be "178200001" and "178200003" respectively, and the truncated portion be the first 5 characters "17820" indicating that they are from the same app/software if similar, and different app/software if dissimilar.

Determining whether the audio playback is a communication audio is crucial because music/speech detection and noise detection alone are not sufficient to solve the problem of applying noise suppression on audio playback with audio from music and movies. For example, in a movie with people talking in a noisy room, the audio playback maybe detected as noisy speech and noise suppression enabled to try to clean up the noisy speech. This is undesirable because noise in the movies is usually introduced intentionally as part of the environmental noise of the movie scene and thus cleaning up the noise would result in the audience not being able to feel (aurally) that they are in the environment shown in the movie, hence degrading the audio from the movie rather than enhancing it. Advantageously, first detecting if the audio playback is a communication audio will allow the noise suppression to be enabled only if it is speech from a communication session such as a conference call, thus avoiding the problem described above. Also, by determining the communication audio in such a manner rather than detecting communication audio by determining if any specific communication program is running, false detection of communication audio is avoided since some communication programs also provide other functions such as text messaging. In addition, determining communication audio by querying the operating system requires less computing resource than checking for music/speech and noise. As such, determining the presence of communication audio is preferably carried out first in step 220 because if there is no communication audio, then step 230 (music detection) and step 240 (noise detection) need not be carried out, and noise suppression can also be disabled/not carried out.

In step 230, the processor determines if the audio playback contains music. Even though determined to be communication audio, the audio playback can still contain music such as musical performances and musical lessons over Zoom. The processor queries a separate process which, for example, uses a Music/Speech Detection Artificial Intelligence (AI) Deep Neural Network (DNN) that analyses if the audio playback contains music or speech. The DNN model is composed of an Input Layer (2D convolution), an Output Layer (Dense), and several hidden layers. The processor determines that the audio playback is not music (and thus is speech) if the DNN ascertains that the audio playback does not contain music, and determines that the audio playback is music (and not speech) if the DNN ascertains that the audio playback contains music. If the processor determines that the audio playback is not music (and thus is speech), the processor will then proceed to determine if the audio playback contain noise in step 240. On the other hand, if the processor determines that the audio playback is music (and not speech), noise suppression will be disabled in step 260.

In step 240, the processor determines if the audio playback contains noise. The processor can do that by querying a separate process which, for example, uses a Noise Detection Artificial Intelligence (AI) Deep Neural Network (DNN) that ascertains if the audio playback contains noise or not. The DNN model is composed of an Input Layer (2D convolution), an Output Layer (Dense), and several hidden layers. The processor determines that noise is not present in the audio playback if the DNN ascertains that the audio playback does not contain noise, and determines that noise is present in the audio playback if the DNN ascertains that the audio playback contains noise. If the processor determines that noise is present in the audio playback, the processor will enable noise suppression in step 250 before going back to step 210. On the other hand, if the processor determines that noise is not present in the audio playback, noise suppression will be disabled in step 260 before going back to step 210.

Determination of whether the audio playback is music or speech is preferably carried out before determination of whether the audio playback contains noise because if the audio playback is music (and not speech), there is no need to determine if the audio playback contains noise. Conversely, if noise detection is carried out first, music detection would still be required whether there is noise detected or not. Advantageously, noise suppression is only carried out for speech rather than for music. Thus, noise suppression will only be applied to the audio playback when it is a communication audio with noisy speech quality. Noise suppression is applied to the audio playback to obtain an audio playback output.

Hence, noise suppression is applied to the audio playback if the audio playback is communication audio, is not music and noise is present (in the audio playback). Otherwise, noise suppression to the audio playback is disabled.

An example of noise suppression can be suppressing of frequency range outside of human conversational vocal range (i.e., from 80 Hz to 255 Hz) by around 50 dB. Another example of noise suppression can be detecting a static noise (such as vacuum cleaner noise or electric shaver noise) in the audio and suppressing the frequencies of the noises detected.

Although the steps in the flow diagram are given sequentially, it should be appreciated that some of the steps can be performed concurrently, or in a different sequence. The steps described may be implemented in hardware, software, firmware, or any combination thereof. For example, the steps can be implemented in various modules of system block diagram 100.

Figure 3:
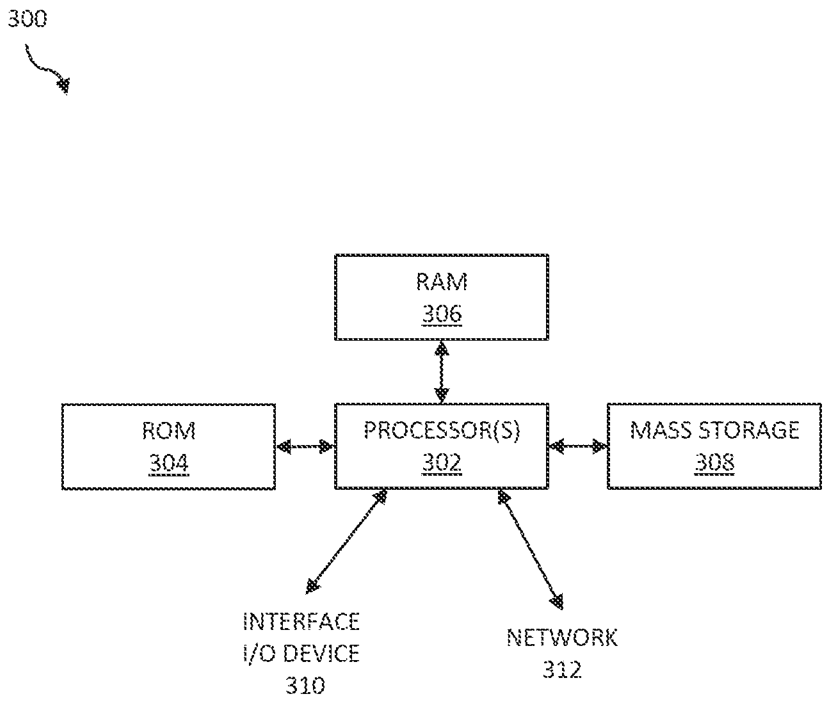
FIG. 3 illustrates a typical computer system that can be used in connection with various embodiments.

This invention also relates to using a software product in a computer system according to one or more embodiments of the present invention. FIG. 3 illustrates a typical computer system 300 that can be used in connection with various embodiments of the present invention. The computer system 300 includes one or more processors 302 (also referred to as central processing units, or CPUs) that are coupled to storage devices including primary storage 306 (typically a random-access memory, or RAM) and another primary storage 304 (typically a read only memory, or ROM). As is well known in the art, primary storage 304 acts to transfer data and instructions uni-directionally to the processor(s) and primary storage 306 is used typically to transfer data and instructions in a bi-directional manner. Both of these primary storage devices may include any suitable computer-readable media, including a software product being embodied in a non-transitory computer-readable medium on which is provided computer executable instructions according to various embodiments of the present invention.

A mass storage device 308 also is coupled bi-directionally to processor(s) 302 and provides additional data storage capacity and may include any of the computer-readable media, including a software product being embodied in a non-transitory computer-readable medium on which is provided computer executable instructions according to various embodiments of the present invention. The mass storage device 308 may be used to store programs, data and the like and is typically a secondary storage medium such as a hard disk that is slower than primary storage. It will be appreciated that the information retained within the mass storage device 308, may, in appropriate cases, be incorporated in standard fashion as part of primary storage 306 as virtual memory. A specific mass storage device such as a CD-ROM may also pass data uni-directionally to the processor(s).

Processor(s) 302 also is coupled to an interface 310 that includes one or more input/output devices such as: video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, processor(s) 302 optionally may be coupled to a computer or telecommunications network using a network connection as shown generally at 312. With such a network connection, it is contemplated that the processor(s) might receive information from the network, or might output information to the network in the course of performing the above-described method steps. The above-described devices and materials will be familiar to those of skill in the computer hardware and software arts.

Thus, it can be seen that a method for selective noise suppression in an audio playback using a communication audio detector (e.g. processor(s)) has been provided. An advantage of the present invention is that it provides a way to selectively apply noise suppression in an audio playback using a communication audio detector. Advantageously, the noise suppression is only enabled if the audio playback is noisy speech from communication audio.

While exemplary embodiments have been presented in the foregoing detailed description of the present embodiments, it should be appreciated that a vast number of variations exists. It should further be appreciated that the exemplary embodiments are only examples, and are not intended to limit the scope, applicability, operation, or configuration of the invention in any way. Rather, the foregoing detailed description will provide those skilled in the art with a convenient road map for implementing exemplary embodiments of the invention, it being understood that various changes may be made in the function and arrangement of steps and method of operation described in the exemplary embodiments without departing from the scope of the invention as set forth in the appended claims.

What is claimed is:

1. A method for selective noise suppression in an audio playback, comprising:

providing a processor;

obtaining a microphone state and a playback device state with the processor from an operating system;

determining the audio playback is communication audio based on the microphone state and the playback device state; and enabling applying noise suppression to the audio playback if the audio playback is communication audio, is not music and noise is present, or otherwise disabling applying noise suppression to the audio playback.

2. The method of claim 1, wherein obtaining the microphone state and the playback device state comprises querying audio functions of the operating system to check the microphone state and the playback device state.

3. The method of claim 1, wherein the audio playback is communication audio only when the microphone state and the playback device state are both active.

4. The method of claim 3, wherein the microphone state and the playback device state are active when acquired or opened by an audio application programming interface.

5. The method of claim 1, wherein obtaining the microphone state and the playback device state comprises obtaining a first identifier and a second identifier from the operating system, the first identifier provided by a first software application/module which acquired a microphone and the second identifier provided by a second software application/module which acquired a playback device, and wherein determining the audio playback is communication audio based on the microphone state and the playback device state comprises determining that the microphone state and the playback device state are both active, and the first identifier and the second identifier are the same.

6. The method of claim 1, wherein obtaining the microphone state and the playback device state comprises obtaining a first identifier and a second identifier from the operating system, the first identifier provided by a first software application/module which acquired a microphone and the second identifier provided by a second software application/module which acquired a playback device, and wherein determining the audio playback is communication audio based on the microphone state and the playback device state comprises determining that the microphone state and the playback device state are both active, and a truncated portion of the first identifier and the second identifier are the same.

7. The method of claim 1, further comprising: determining that the audio playback is not music and noise is present in the audio playback, wherein determining the audio playback is communication audio based on the microphone state and the playback device state is carried out before determining that the audio playback is not music and noise is present in the audio playback.

8. A software product for selective noise suppression in an audio playback, the software product being embodied in a non-transitory computer readable medium and comprising computer executable instructions for:

obtaining a microphone state and a playback device state with a processor from an operating system;

determining the audio playback is communication audio based on the microphone state and the playback device state; and enabling applying noise suppression to the audio playback if the audio playback is communication audio, is not music and noise is present, or otherwise disabling applying noise suppression to the audio playback.

9. The software product of claim 8, wherein obtaining the microphone state and the playback device state comprises querying audio functions of the operating system to check the microphone state and the playback device state.

10. The software product of claim 8, wherein the audio playback is communication audio only when the microphone state and the playback device state are both active.

11. The software product of claim 10, wherein the microphone state and the playback device state are active when acquired or opened by an audio application programming interface.

12. The software product of claim 8, wherein obtaining the microphone state and the playback device state comprises obtaining a first identifier and a second identifier from the operating system, the first identifier provided by a first software application/module which acquired a microphone and the second identifier provided by a second software application/module which acquired a playback device, and wherein determining the audio playback is communication audio based on the microphone state and the playback device state comprises determining that the microphone state and the playback device state are both active, and the first identifier and the second identifier are the same.

13. The software product of claim 8, wherein obtaining the microphone state and the playback device state comprises obtaining a first identifier and a second identifier from the operating system, the first identifier provided by a first software application/module which acquired a microphone and the second identifier provided by a second software application/module which acquired a playback device, and wherein determining the audio playback is communication audio based on the microphone state and the playback device state comprises determining that the microphone state and the playback device state are both active, and a truncated portion of the first identifier and the second identifier are the same.

14. The software product of claim 8, further comprising: determining that the audio playback is not music and noise is present in the audio playback, wherein determining the audio playback is communication audio based on the microphone state and the playback device state is carried out before determining that the audio playback is not music and noise is present in the audio playback.

15. A system for selective noise suppression in an audio playback, comprising:

a communication audio detection module configured for receiving a microphone state and a playback device state, and determining the audio playback is communication audio based on the microphone state and the playback device state;

a music detection module configured for determining the audio playback is not music;

a noise detection module configured for determining the audio playback has noise present;

an enable noise suppression module configured for enabling applying noise suppression to the audio playback if the audio playback is communication audio, is not music and noise is present; and a disable noise suppression module configured for disabling applying noise suppression to the audio playback if the audio playback is not communication audio, and/or is music, and/or noise is not present.

* * * * *